United States Patent [19]

Asano et al.

[11] Patent Number: 4,574,905

[45] Date of Patent: Mar. 11, 1986

[54] STEERING FORCE CONTROLLING APPARATUS FOR POWER STEERING SYSTEM

[75] Inventors: Hiroaki Asano, Chiryu; Keiichi Nakamura, Kariya; Yutaka Mori, Toyokawa, all of Japan

[73] Assignee: Toyoda Koki Kabushiki Kaisha, Kariya, Japan

[21] Appl. No.: 552,067

[22] Filed: Nov. 15, 1983

[30] Foreign Application Priority Data

Nov. 16, 1982 [JP] Japan .................. 57-200743

[51] Int. Cl.⁴ .............................. B62D 5/08
[52] U.S. Cl. .................................. 180/142
[58] Field of Search .............. 180/141, 142, 143, 79.1, 180/132; 364/424, 425

[56] References Cited

U.S. PATENT DOCUMENTS

| 4,274,504 | 6/1981 | Kawabata et al. | 180/143 |
| 4,293,051 | 10/1981 | Nishikawa | 180/143 X |
| 4,437,532 | 3/1984 | Nakamura et al. | 180/142 |
| 4,476,529 | 10/1984 | Nakamura et al. | 180/142 X |
| 4,485,883 | 12/1984 | Duffy | 180/142 |

FOREIGN PATENT DOCUMENTS

| 54-53427 | 4/1979 | Japan | 180/142 |
| 56-97110 | 8/1981 | Japan | |
| 57-53236 | 11/1982 | Japan | |
| 58-36763 | 3/1983 | Japan | 180/143 |

Primary Examiner—Joseph F. Peters, Jr.
Assistant Examiner—Charles R. Watts
Attorney, Agent, or Firm—Oblon, Fisher, Spivak, McClelland & Maier

[57] ABSTRACT

An apparatus for electronically controlling the steering force needed to operate the handle of a vehicle, according to the velocity of the vehicle and the angular displacement of the handle. The apparatus includes a memory for storing various characteristic maps of different steering characteristics, a selecting switch for selecting one of these maps, and a control circuit for applying the electric current depending on the selected map to the solenoid of a flow control means which controls the pressure flow supplied to the power cylinder of a power steering system. The driver of the vehicle can select any desired control pattern from the memory by operating the selecting switch.

6 Claims, 7 Drawing Figures

STEERING FORCE CONTROLLING APPARATUS FOR POWER STEERING SYSTEM

FIELD OF THE INVENTION

The present invention relates to a steering force controlling apparatus for a power steering system and, more particularly, to an apparatus for electronically controlling steering force according to the velocity of the vehicle, the angular displacement of the handle or the like.

BACKGROUND OF THE INVENTION

Recenty, steering systems making use of a microcomputer to store the characteristic map of a given control pattern in its memory have been developed. The microcomputer receives a signal representing the velocity of the vehicle or the angular displacement of the handle as a control input, and the characteristic map is thereby read out to achieve an accurate control over the steering force.

The steering characteristics of the aforementioned systems are set to the characteristic map of either the control pattern adapted for vehicles of specific classes or an average control pattern satisfying most drivers. Hence, such systems may introduce problems if used on a different class of vehicle. Further, the aforementioned steering characteristics may not be suitable for some drivers. In addition, once such a steering system has been installed on a vehicle, it is not possible to alter the characteristic map in the memory. Therefore, the conventional system is unable to cope with driver's demand or desire for lighter or heavier force to operate the handle.

SUMMARY OF THE INVENTION

Accordingly, it is the main object of the present invention to provide a steering force controlling apparatus which has various characteristic maps for different control patterns, and which selects one of them according to the manner of traveling of the vehicle or the class of the vehicle, and can further control the steering force so as to accommodate the driver.

Other and further objects of the invention will appear in the course of the description thereof which follows.

BRIEF DESCRIPTION OF THE DRAWINGS

FIGS. 7(I)-7 (IV) are graphs of the output pressure against the steering torque for various control patterns.

DETAILED DESCRIPTION OF THE INVENTION

Figure 1:
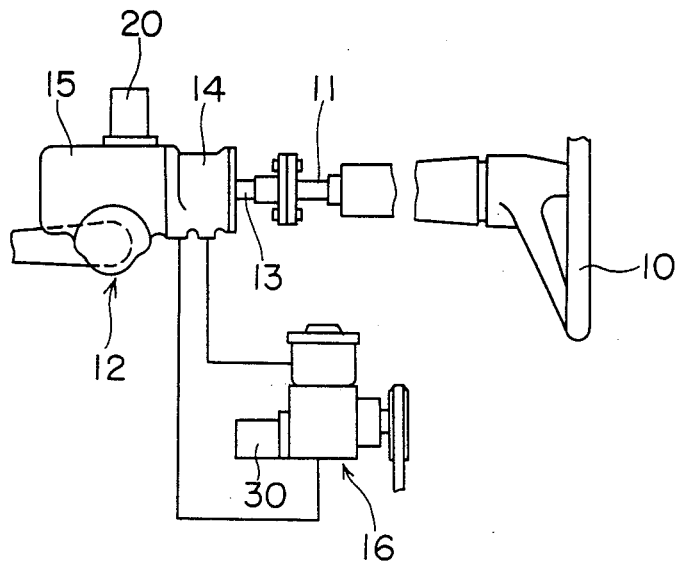
FIG. 1 is a schematic representation of a power steering system according to the present invention.

Referring first to FIG. 1, there is shown a power steering system 12 embodying the concept of the present invention, as well as a steering handle 10 mounted to one end of a handle shaft 11. The steering system 12 has a steering shaft 13 connected to the other end of the shaft 11, and it comprises a servo valve 14 and a power cylinder 15. The servo valve is controlled by a torque, which is produced by a driver's steering operation and is transmitted to the steering shaft 13. Distribution of pressure fluid in the power cylinder 15 is controlled by the servo valve 14. The steering torque is augmented by the power cylinder 15 and transmitted to the steering wheels via a control link mechanism (not shown). To supply the pressure fluid to the servo valve 14 of the power steering system 12, a pump 16 driven by the engine is provided. The flow delivered by the pump 16 is adjusted by a flow control device (described later).

Figure 2:
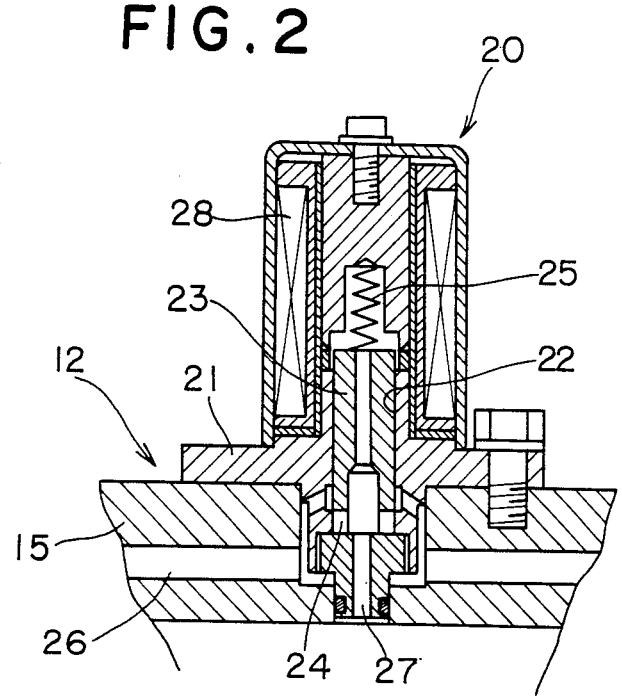
FIG. 2 is a cross-sectional view of the linear solenoid valve for controlling the communication between the chambers at the opposite ends of the power cylinder of the power steering system shown in FIG. 1.

Referring next to FIG. 2, there is shown a linear solenoid valve 20 serving to shunt and unshunt the fluid supplied to the chambers at the opposite ends of the power cylinder 15 in accordance with the velocity of the vehicle or other factor. The body 21 of the valve is provided with an internal hole 22, in which a core member 23 is fitted so as to be slidable therein. The core member 23 is provided with a slit 24 to shunt the fluid and is usually held at the lower end of the hole 22 by the action of a spring 25, so that the core member cuts off the communication between a passage 26 communicating with the left chamber of the cylinder 15 and a passage 27 communicating with the right chamber of the cylinder 15. When a solenoid 28 is energized, it attracts the core member 23. Then, the core member is displaced upward against the resilience of the spring 25 and hence the passages 26 and 27 are caused to communicate with each other via the slit 24. In this way, the steering force is changed according to the quantity of the displacement of the core member 23, that is, according to the magnitude of the current applied to the solenoid 28.

Figure 3:
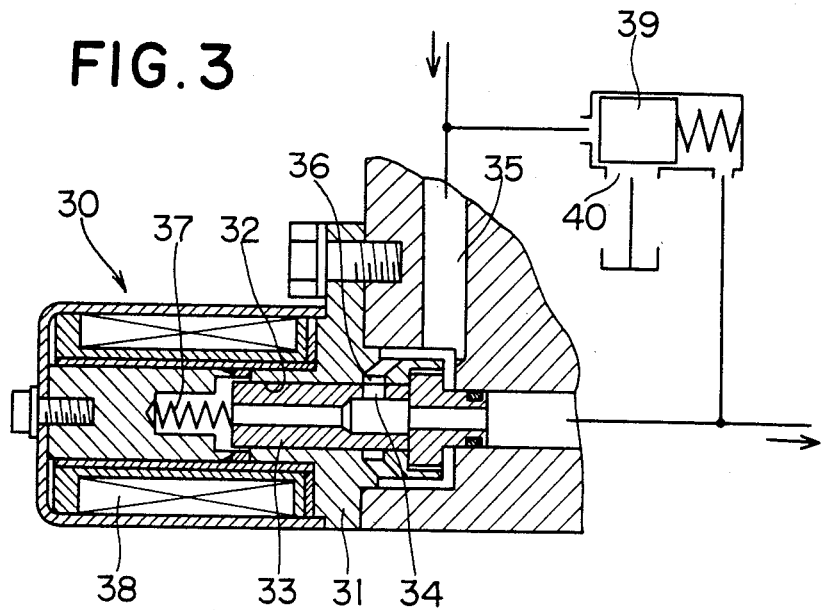
FIG. 3 is a cross-sectional view of one linear solenoid valve of the system shown in FIG. 1, the valve acting to control the flow delivered by the pump of the system shown in FIG. 1.

Referring to FIG. 3, there is shown the aforementioned control device equipped with a linear solenoid valve 30 to control the flow supplied to the servo valve 14 described above. The body 31 of this valve 30 is formed with an internal hole 32, in which a core member 33 is fitted so as to be slidable therein. The core member 33 is provided with a control hole 34. An adjustable restrictor 36 is formed between the hole 34 and a passage 35 communicating with the region to which the pump 16 discharges fluid. The passage 35 is placed in communication with the servo valve 14 via the restrictor 36. Usually, a spring 37 urges the core member 33 into the shown end position at which sliding movement of the member 33 terminates. Thus, the spring maintains the adjustable restrictor 36 in its fully open state. When the solenoid 38 is energized and the core member 33 is drawn against the resilience of the spring 37 by the attracting force of the solenoid 38, the opening of the restrictor 36 is reduced in proportion to the magnitude of the current fed to the solenoid.

A by-pass valve 39 directs the surplus of the pressure fluid delivered by the pump 16 toward the intake side. The valve 39 responds to the pressure difference across the restrictor 36 and controls the opening of a by-pass 40 so as to keep this pressure difference constant at all times. In this fashion, the flow furnished to the servo valve 14 is reduced according to the magnitude of the current supplied to the solenoid 38, and therefore the steering force is varied.

Figure 4:
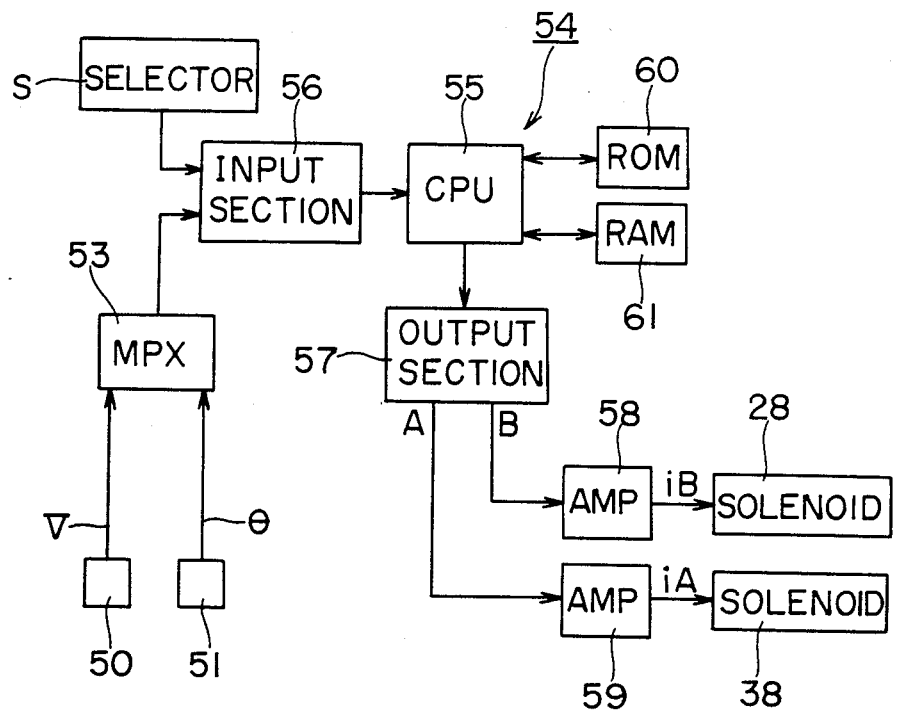
FIG. 4 is a block diagram of the control circuit for the solenoid in the system shown in FIG. 1.

FIG. 4 is a control circuit for controlling the above-described two solenoids 28 and 38. Indicated by reference numerals 50 and 51 are sensors for detecting the velocity V of the vehicle and the angular displacement $\theta$ of the handle, respectively. The analog outputs from these sensors 50 and 51 are applied to a multiplexer 53, and then these signals are fed in a time-sharing manner to the control circuit consisting of a microcomputer 54. This microcomputer 54 has a central processing unit 55, abbreviated CPU, for arithmetically processing signals in digital form. The input section 56 of the microcomputer converts its input signal from the multiplexer 53 into digital form and delivers the resultant signal to the CPU 55. The input section 56 also receives the signal from a selecting device S such as a selecting switch to deliver a signal to the CPU 55 for selecting one of various characteristic maps for control patterns, as described later. The output section 57 of the microcomputer converts the control signal into analog form. The resultant signal is applied from two output ports A and B to the aforementioned linear solenoids 38 and 28, respectively, via amplifiers 59 and 58, respectively. A read-only memory 60, abbreviated ROM, stores a fixed program (described later). Indicated by reference numeral 61 is a random access memory 61, abbreviated RAM, which is capable of writing in or reading out data.

Figure 5:
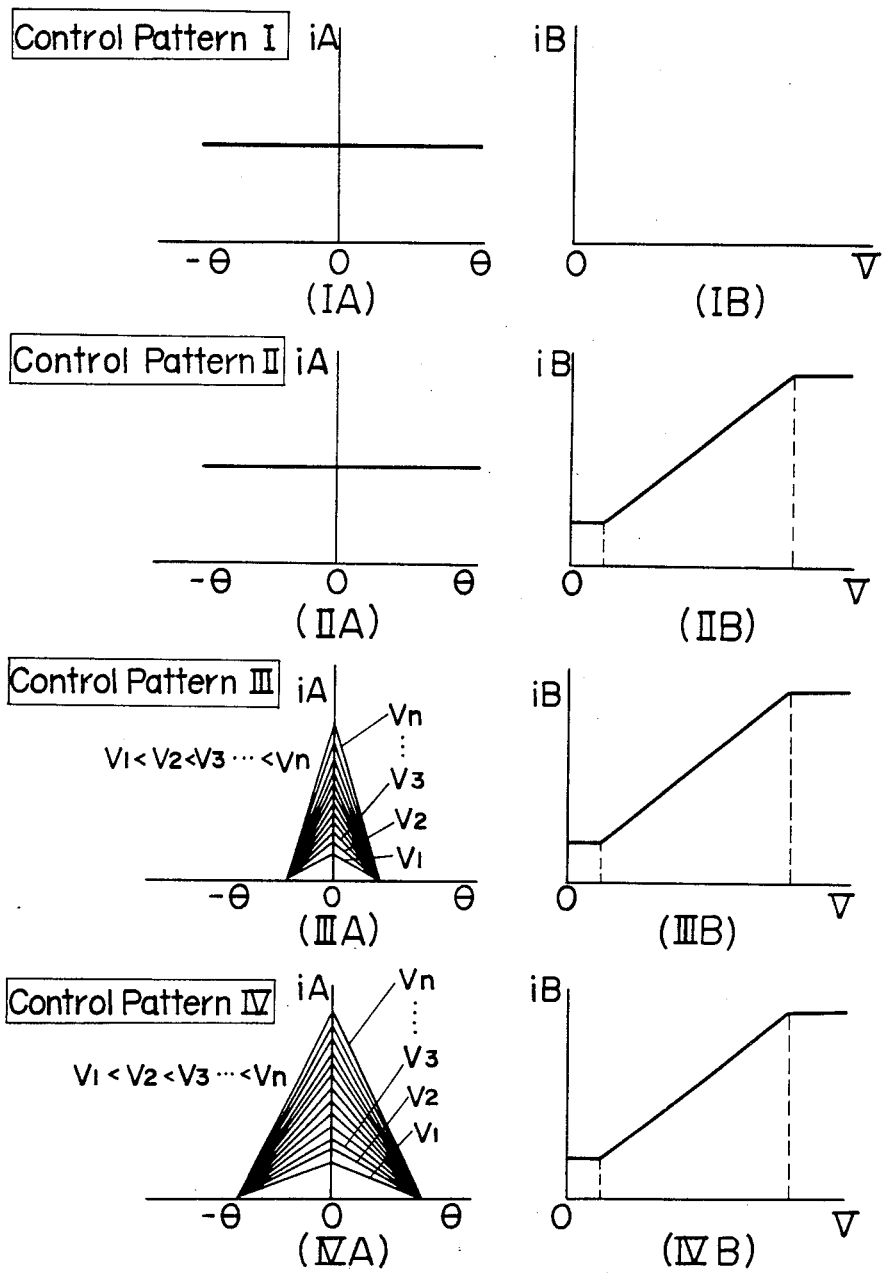
FIGS. 5 (IA)-5(IVB) are graphs of the control currents used in the system of FIG. 1, for showing changes in the control currents.

FIG. 5 shows the fixed programs stored in the ROM 60 in the form of graphs. Four programs are provided for four control patterns, namely, a first control pattern I consisting of the combination of characteristic maps IA and IB, a second control pattern II consisting of the combination of characteristic maps IIA and IIB, a third control pattern III consisting of the combination of characteristic maps III A and IIIB, and a fourth control pattern IV consisting of the combination of characteristic maps IV A and IV B. Among these maps, the characteristic maps IA, IIA, IIIA and IV A are used to energize the solenoid of the linear solenoid valve 30 which controls the flow supplied to the servo valve 14, while the characteristic maps IB, IIB, III B and IV B are used to energize the solenoid of the linear solenoid valve 20 that shunts and unshunts the chambers at both ends of the power cylinder 15.

The characteristic maps IA, II A, III A and IV A described above indicate the value of current iA to be applied to the solenoid 38 of the linear solenoid valve 30 according to the angular displacement $\theta$ of the handle and the velocity V of the vehicle. For example, in the characteristic maps IA and II A, the programs are so prepared that constant control current iA is furnished, irrespective of changes in the velocity V and in the angular displacement $\theta$. Accordingly, whenever the characteristic map I A or II A is selected, the data is fetched from the given addresses and the constant control current iA is supplied.

In the characteristic map III A, the velocity V of the vehicle is separated into a plurality of velocity ranges from $V_{MIN}$ to $V_{MAX}$, and the control current iA relative to the angular displacement $\theta$ of the handle is set for each velocity range. More specifically, the control current iA is so set as to become smaller as the displacement $\theta$ increases and become larger as the velocity V increases. Consequently, when the characteristic map IIIA is selected, one velocity range is first specified, corresponding to the value of the velocity V detected. Within this range, some addresses are then specified according to the value of the angular displacement $\theta$ detected. Thus, the data is read out to give the control current iA.

The characteristic map IV A is similar in nature to the aforementioned map III A except that the control current iA decreases with the angular displacement $\theta$ of the handle at a reduced rate. Thus, when the characteristic map IV A is selected, data indicating the control current iA is read out from the given addresses.

The other characteristic maps IB, II B, IIIB and IV B indicate the value of the current iB to be applied to the solenoid 28 of the linear solenoid 20 according to the velocity V of the vehicle. For instance, in the characteristic maps IIB, III B and IV B, the control current iB is so set as to increase with the velocity V of the vehicle. Hence, when any one of the characteristic maps IIB, III B, IV B is selected, the given addresses are specified according to the value of the velocity V detected. Then, data is read out from the addresses to determine the supplied control current iB.

In the characteristic map IB, the control current iB is set equal to zero, regardless of the magnitude of the velocity V. Therefore, when the control pattern IB is selected, data indicating zero current is read out from the specified addresses, independently of the velocity V of the vehicle.

The control operation of the steering force control apparatus as hereinbefore described is now described with reference to the flowchart of FIG. 6. The control inputs which indicate the velocity V of the vehicle and the angular displacement $\theta$ of the handle and vary at every moment are derived from the sensors 50 and 51, respectively, and are supplied to the input section 56 of the CPU 54 via the multiplexer 53. Then, unwanted components of these signals are filtered out, and subsequently, these signals are stored in the RAM 61.

After initiating the procedure, data indicating the velocity V of the vehicle and the angular displacement $\theta$ which were stored are read in the RAM 61 and then transferred to a buffer register, in the initial step 100. Then, one of the control patterns I, II, III and IV is selected according to the condition of the selecting device S, in step 101. If the pattern I is selected, for example, the procedure proceeds to step 102, in which data indicating the control current iA is taken from characteristic map IA based on the displacement $\theta$ and the velocity V and stored in the memory. Then in step 103, the control current iA is delivered from the output port A of the output section 57 to the solenoid 38 of the linear solenoid valve 30.

Thereafter, in step 104, data indicating the control current iB is taken from the characteristic map IB shown in FIG. 5 based on the velocity V and then it is stored in the memory. Then, in step 105, the control current iB is delivered from the output port B of the output section 57 to the solenoid 28 of the linear solenoid valve 20. For these characteristic maps IA and IB, the value of the control current iA is maintained constant, irrespective of changes in the angular displacement $\theta$ of the handle. Also, the value of the control current iB is set equal to zero, independently of variations in the velocity V of the vehicle. Therefore, it will be understood from FIG. 7 (I) that each pressure characteristic curve has a constant curvature, regardless of changes in the velocity V or in the angular displacement $\theta$. Consequently, the novel apparatus functions as an ordinary power steering system, though it does not exhibit stability during high speed running of the vehicle or in the neutral condition of the handle.

If the aforementioned control pattern I is not suitable to the driver, he or she can select another control pattern by operating the selecting device S. For example, if the driver selects the control pattern II by actuating the selecting device S, the steps 201 through 205 shown in FIG. 6 are executed, with the result that the values of the control currents iA and iB applied to the solenoids 38 and 28, respectively, are set based on the characteristic maps IIA and IIB. According to these maps IIA and IIB, the control current iA is kept constant at all times, irrespective of changes in the angular displacement $\theta$ of the handle, but the control current iB is increased as the velocity V of the vehicle is increased. Hence, as shown in FIG. 7(II), the output pressure P reduces as the velocity V increases. The result is that larger force is needed to operate the handle, whereby it shows stability at high speeds.

Figure 6:
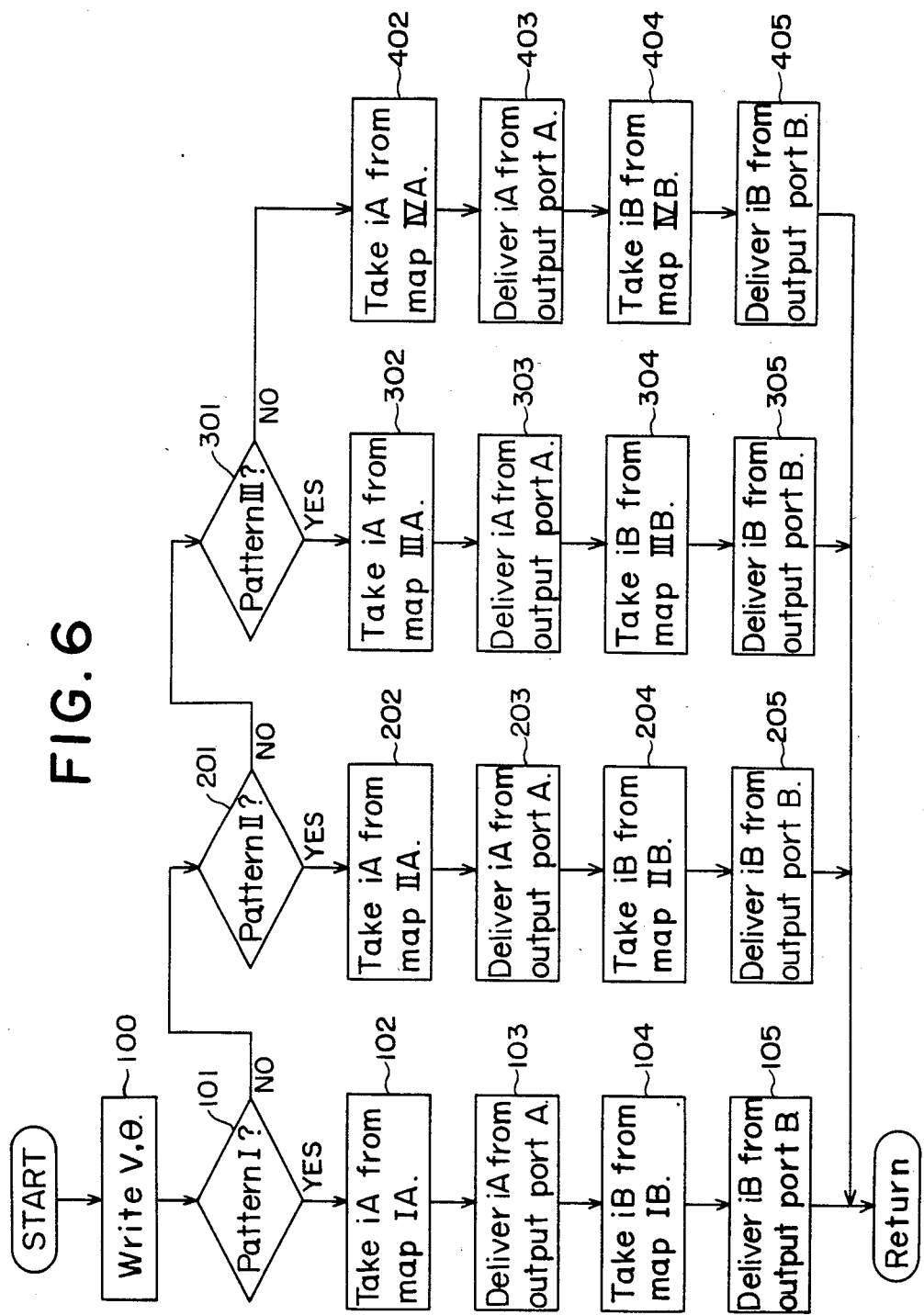
FIG. 6 is a flowchart illustrating a control program.
Figure 7:
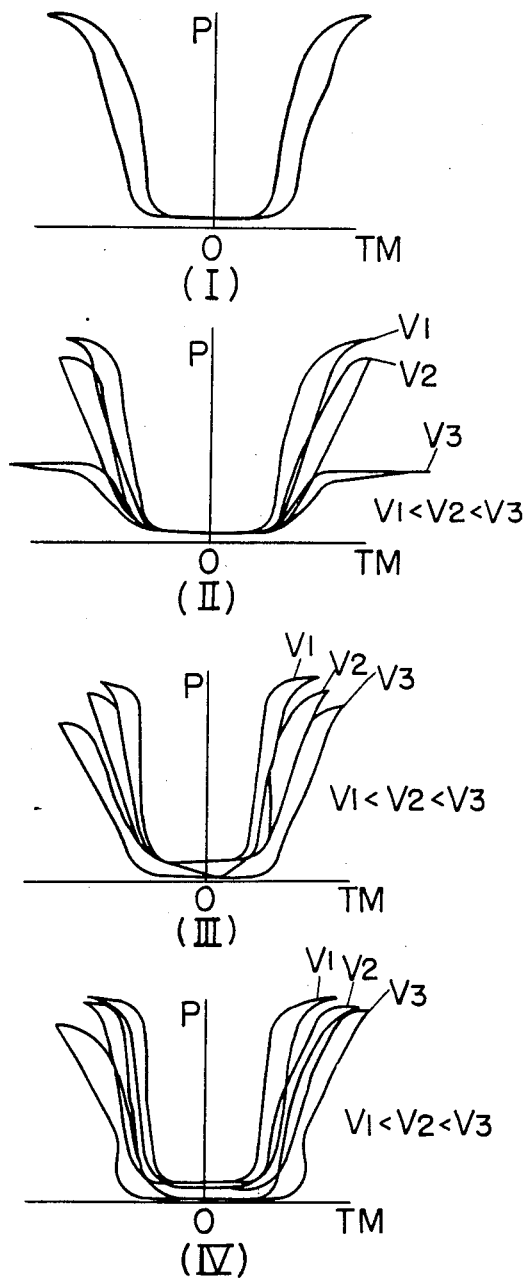

When the driver selects the control pattern III, the steps 301–305 shown in FIG. 6 are carried out, with the result that the values of the control currents iA and iB applied to the solenoids 38 and 28, respectively, are set based on the characteristic maps III A and III B. According to these maps IIIA and III B, the currents iA and iB applied to the solenoids 38 and 28, respectively, assume large values when the vehicle is running at a high speed. This reduces the flow delivered by the pump 16 and enlarges the area with which the chambers at both ends of the power cylinder 15 are in communication with each other. Thus, as can be seen from the pressure characteristic diagrams of FIG. 7 (III), the output pressure P decreases as the velocity assumes a higher value from $V_1$ toward $V_3$, with the result that a greater force is necessary to operate the handle. In this way, stability is offered at high speeds. Further, since the output pressure P assumes a minimum value when the handle is controlled such that the vehicle goes straight, greater stability is provided during the neutral condition of the handle.

In case where the driver selects the control pattern IV, the steps 402–405 shown in FIG. 6 are carried out. Consequently, the values of the control currents iA and iB applied to the solenoids 38 and 28, respectively, are set based on the characteristic maps IV A and IV B. In this case, the control current iA decreases at a lower rate with changing angular displacement $\theta$ of the handle than the former case of the characteristic map III. Therefore, as can be seen from FIG. 7 (IV), the output pressure P will not increase unless a large steering torque TM is imparted to the handle, whereby enhancing the steering stability in the neutral condition of the handle.

In this manner, when the selecting device S as described previously is installed in the interior of the vehicle, the driver can have a desired steering feeling by operating the selecting device S so as to select an appropriate control pattern.

In the above embodiment, the linear solenoid valve 20 placing the chambers at both ends of the power cylinder 15 in communication with each other is used together with the linear solenoid valve 30 which controls the flow delivered by the pump 16. When only the valve 20 of these valves is effectively used, the pressure characteristics have such features that the pressure P rises slowly and that the maximum pressure depends on the velocity V of the vehicle, as shown in FIG. 7(II).

On the other hand, when the two linear solenoid valves 20 and 30 are operated at the same time, the pressure characteristics have the following features. The pressure P describes curves like character "U" which rise abruptly at specific points, as shown in FIG. 7(III). The maximum pressures are held substantially constant. The pressure in the neutral state of the handle is made lower. When the two solenoid valves 20 and 30 are used at a time in this way, the kinds of characteristics that can be selected are increased by controlling one or both of these valves, thus resulting in an increase in the degree of freedom of control. Further, characteristics suitable to the driver and the class of the vehicle can be set.

Although the selecting device S is operated manually by the driver in the above embodiment, the present invention is not limited to such a specific example. For example, the selecting device S may be automatically operated using sensors which detect the condition in which the vehicle is running, that is, whether the path along which the vehicle is running is upward or downward, whether the path has turns and twists, whether the path is graveled or asphalted, whether the vehicle is subjected to side wind, the weight of the load carried by the vehicle, and so forth.

Also, it is to be noted that in the above embodiment the linear solenoid valve 20 for controlling the communication between the chambers at both ends of the power cylinder 15 is controlled essentially as a function of the velocity of the vehicle, and the flow discharged by the pump 16 is controlled essentially as a function of the angular displacement of the handle and of the velocity of the vehicle. It is to be noted that similar utility may be obtained by controlling the valve 20 as a function of the angular displacement and of the velocity, and controlling the valve 30 as a function of the velocity.

As described hereinbefore, the novel apparatus provides a plurality of characteristic maps of different control patterns, and these maps can be selected at discretion by virtue of the selecting device. Accordingly, it is easy for the driver to select the characteristic according to his or her desire, the manner of traveling of the vehicle and the class of the vehicle, using the selecting device. Hence, the driver's demands for lighter or heavier force needed to operate the handle and for greater stability in operating the handle when the handle is in neutral condition can be readily satisfied by himself or herself. In this way, the force required to operate the handle can be controlled to accommodate the driver's desire.

Obviously many modifications and variations of the present invention are possible in the light of the above teachings. It is therefore to be understood that within the scope of the appended claims the invention may be practiced otherwise than as specifically described.

What is claimed is:

1. A steering force controlling apparatus for a power steering system having a power cylinder for controlling the direction of a vehicle wheel, a pump for supplying pressurized fluid and a servo valve operable by a steering torque manually applied to a steering wheel for controlling delivery of pressurized fluid from said pump to said power cylinder, said steering force controlling apparatus comprising:
    a first solenoid-operated throttle valve for controlling the supply flow of said pressurized fluid from said pump to said servo valve in proportion to the magnitude of a first control current applied thereto;

a second solenoid-operated throttle valve for controlling the bypass flow of said pressurized fluid between opposite chamber of said power cylinder in proportion to the magnitude of a second control current applied thereto;

first and second detectors for respectively outputting first and second detection signals;

memory means for storing plural pairs of first and second characteristic maps, each of said first characteristic maps defining various first parameters respectively relating to various values of said first detection signal, and each of said second characteristic maps defining various second parameters respectively relating to various values of said second detection signal;

selector means operable for generating a selection signal to designate one pair of said plural pairs of said first and second characteristic maps;

control means responsive to said selection signal and said first and second detection signals for reading out from said memory means one of said various first parameters and one of said various second parameters which are defined in one pair of said first and second characteristic maps designated by said selection signal, based upon said first and second detection signals; and drive means connected to said control means and said first and second solenoid-operated throttle valves for applying said first and second control currents of the magnitudes respectively corresponding to said readout one of said various first parameters and said readout one of said various second parameters, respectively to said first and second solenoid-operated throttle valves.

2. A steering force controlling apparatus as set forth in claim 1, wherein each of said first and second solenoid-operated throttle valves comprises:

a variable throttle device having a control element movable for regulating the opening degree of a throttle hole; and a linear characteristic solenoid for magnetically moving said control element in proportion to the magnitude of a corresponding one of said first and second control currents applied thereto.

3. A steering force controlling apparatus as set forth in claim 2, wherein:

said pump includes a flow control valve for returning to said pump an excess part of said pressurized fluid which is delivered to said servo valve; and said variable throttle device of said first solenoid-operated throttle valve is connected in parallel relation with said flow control valve so that the volume of said excess part of said pressurized fluid is controlled by said flow control device so as to maintain the pressure difference across said variable throttle device constant.

4. A steering force controlling apparatus as set forth in claim 1, wherein:

said selector means is manually operable.

5. A steering force controlling apparatus as set forth in claim 4, wherein:

said first and second detection signals respectively represent the rotational angle of said steering wheel and a vehicle driving speed.

6. A steering force controlling apparatus as set forth in claim 5, wherein:

each of said various first parameters defined in at least one of said first characteristic maps relates not only to a rotational angle of said steering wheel but also to a vehicle driving speed; and said control means is operable to read out from said memory means one of said various first parameters determined not only by a rotational angle from said first detector but also by a vehicle driving speed from said second detector when said at least one of said first characteristic maps is designated by said selection signal from said selector means.

* * * * *